Figure 1:
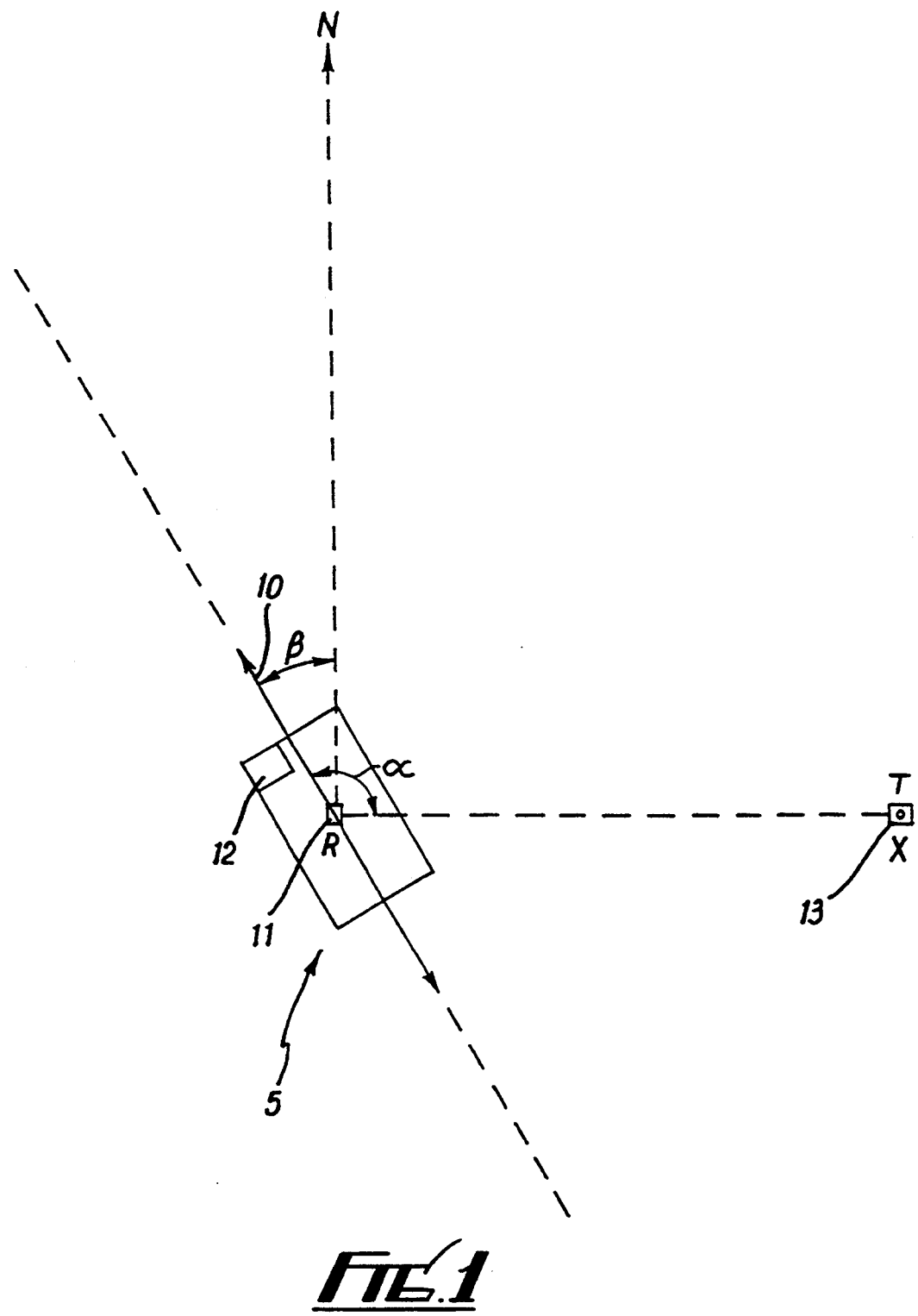

United States Patent [19]
Tong

[11] Patent Number: 5,280,293
[45] Date of Patent: Jan. 18, 1994

[54] MOBILE DIRECTION FINDER

[75] Inventor: David A. Tong, Yorkshire, United Kingdom

[73] Assignee: Datong Electronics Limited, Leeds, England

[21] Appl. No.: 944,080

[22] Filed: Sep. 11, 1992

[30] Foreign Application Priority Data

Sep. 13, 1991 [GB] United Kingdom ............... 9119564

[51] Int. Cl.$^5$ ............................................. G01S 5/02
[52] U.S. Cl. ...................................... 342/417; 342/457
[58] Field of Search ................... 342/419, 417, 457

[56] References Cited

U.S. PATENT DOCUMENTS 3,671,967  6/1972  Fries .
5,173,709  12/1992  Lauro et al. ...................... 342/443

FOREIGN PATENT DOCUMENTS 97491     1/1984   European Pat. Off. .
1069382   5/1967   United Kingdom .
1285508   8/1972   United Kingdom .
1375221  11/1974   United Kingdom .

Primary Examiner—Theodore M. Blum
Attorney, Agent, or Firm—Fisher Christen & Sabol

[57] ABSTRACT

A mobile direction finder for tracking a remote transmitter computes the transmitter direction relative to the direction finder and time-averages with reference to a datum derived from a predetermined orientation independent of the direction finder orientation.

12 Claims, 2 Drawing Sheets

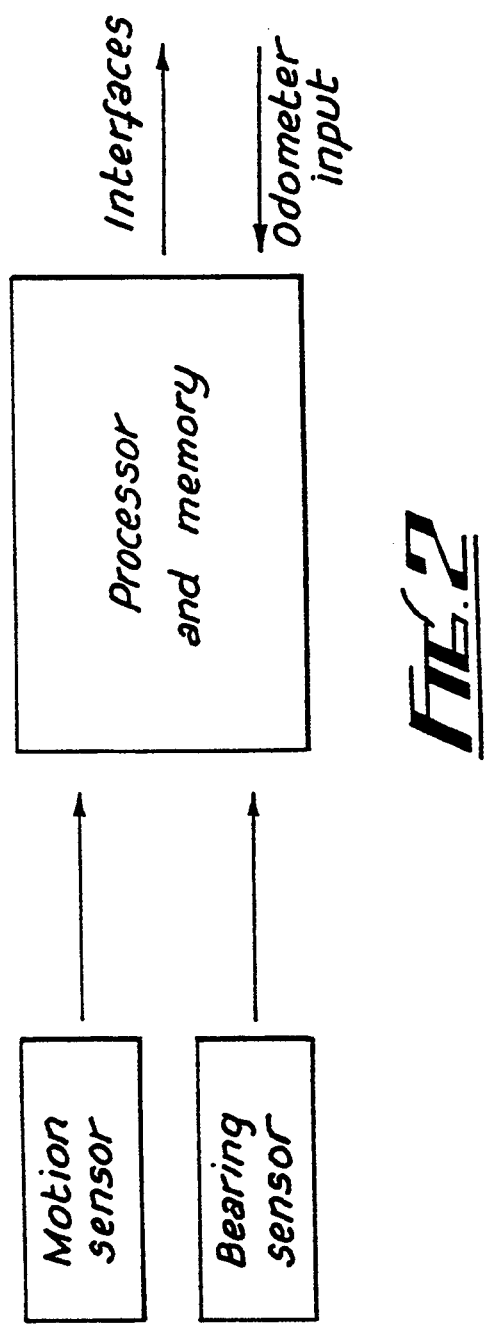

MOBILE DIRECTION FINDER

This invention relates to a mobile direction finder for tracking a remote transmitter.

A mobile direction finder may be mounted on a vehicle, such as a car, and may be used for tracking a transmitter, which may also be vehicle mounted or which may be fixed, by reception of radio signals from the transmitter, the received signals being used to calculate the direction of the transmitter relative to the axis of a direction finding antenna array which would typically be aligned with the front-rear axis of the vehicle.

With this arrangement there is the problem of multipath interference, particularly when used on a road in a city, due to reflection or scattering of signals from large objections such as buildings or other vehicles. Signals arrive from the transmitter via a variety of different paths and the calculated direction corresponds to the resultant of all the separately arriving signals and may depart widely from the 'true' direction which would be expected in the absence of reflection or scattering.

Moreover, as the direction finder moves horizontally, due to movement and turning of the tracking vehicle, the set of reflected and scattered signals can change rapidly. In this respect, it will be understood that reflections from objects close to the direction finder will have a much greater effect than those caused by objects close to the transmitter. The result is that the displayed direction tends to jitter wildly and in some severe cases may be very difficult to interpret.

With a view to reducing this problem it is known to time-average or integrate the received direction signals prior to display of a calculated direction. This time-averaging procedure tends to give a much better representation of the true direction of the transmitter when the direction finder is moving, because the movement leads to the reflection or scattering being essentially of a random nature.

However, with movement of the direction finder, the problem arises that limitations are imposed on the averaging period. If the period is too long, calculations of the direction of the tracked transmitter will be affected by changes in the direction of movement of the direction finder vehicle and/or the vehicle carrying the transmitter. In effect the response to genuine changes in the direction of the transmitter is slowed down. Accordingly, in practice, the averaging period may be limited to 1 to 3 seconds.

An object of the present invention is to provide a mobile direction finder with which an extended averaging period can be used without unduly slowing down the effective response time to changes in orientation of the tracking vehicle.

According to the invention therefore there is provided a mobile direction finder for tracking a transmitter remote therefrom, said direction finder comprising a receiver for receiving signals from the transmitter, direction-computing means for computing a direction of the transmitter relative to the direction finder from the received signals, and time-averaging means for averaging the direction computations over signal-receiving time periods, characterised in that there is also provided a reference device which establishes a datum derived from a predetermined orientation independent of the orientation of the direction finder, and the time-averaged direction computations are made with reference to said datum.

With this arrangement, it is possible to use a relatively long time-averaging period to give effective reduction of the effects of multipath interference, without unduly adversely affecting the time of response to changes in orientation of the tracking vehicle. This is because the received signals are 'corrected' for any changes in orientation of the direction finder, before the time-averaged computations are carried out.

The datum may be derived from magnetic north whereby the reference device may be a magnetic compass. The invention is not however restricted to this and any other suitable reference device or datum may be used, since it is the change relative to the datum, rather than the datum itself, which is important. Thus, a gyrocompass may be used, or movements of the direction finder relative to a starting position may be monitored e.g. by monitoring differential rotation of driving wheels of a vehicle on which the direction finder is mounted.

The resulting time-averaged computed direction information may be displayed in its 'corrected' form i.e. as a bearing relative to the datum e.g. as a compass bearing. Alternatively, the information may be 'uncorrected', prior to display, using up-to-date information as to the current orientation of the direction finder so that it is possible to display the direction of the transmitter relative to the direction finder. Display may be achieved in any suitable manner and thus may involve a screen display or print out or the like.

The direction finder of the invention may be used on a vehicle such as a car with a direction finding antenna array rigidly mounted on the vehicle so that the antenna array will turn with the vehicle.

The invention will now be described further by way of example only and with reference to the accompanying drawings, wherein:

FIG. 1 shows a diagrammatic representation of one form of direction finder according to the invention; and FIG. 2 is a block diagram representation of an extended averaging unit.

Referring now to FIG. 1, there is shown a tracking vehicle 5 having a front to back axis marked 10. The tracking vehicle has mounted relative thereto a radio receiver 11 and associated microprocessor-based control and processing circuitry 12. The receiver 11 is connected to an antenna array (not shown) rigidly mounted at a fixed position on the vehicle. The circuitry is connected to a bearing display device (not shown) mounted within the vehicle and which is arranged to display (e.g. on a VDU or other screen) a representation of bearing (discussed further hereinafter).

A radio transmitter 13 is mounted relative to a body to be tracked (not shown) and thus for example could be concealed about the body or clothes of a person or could be mounted on or in a vehicle. The transmitter 13 is disposed at a tracking point, the tracking point being movable and representing the position at which the body to be tracked is at, at any instant in time.

The transmitter 13 and receiver 11 are of conventional form and typically operate in the HF VHF and UHF frequency range.

In use, the receiver 11 which is mounted in the tracking vehicle 5 monitors signals received from the transmitter 13 and, from these signals, the processing circuitry 12 is able to calculate the "heading" of the transmitter 13 relative to the front-back axis 10 of the tracking vehicle 5, i.e. angle $\alpha$ in the figure. It will be appreciated that the signals received by the receiver 12 from the transmitter 13 will contain signals received directly and also via multi-paths (i.e. after reflection or scattering from buildings or vehicles or other objects) and will of course be dependent on the orientation of the vehicle 5 relative to the transmitter 13.

In order to reduce the effect of multipath interference, the received signals are time-averaged by the circuitry 12 prior to calculation of the heading. First, however, the signals are 'corrected' to allow for changes in orientation of the vehicle 5 relative to the transmitter 13.

Thus, the present arrangement includes an orientation monitor which is operable to monitor the orientation of the tracking vehicle 5 relative to the transmitter, by relating the front-back axis 10 of the vehicle 5 to a predetermined reference direction or reference frame. The orientation monitor can comprise a magnetic compass, gyrocompass, a device which monitors the differential rotation of the driving wheels of the vehicle or any other device as desired or as appropriate which enables a measurement of the orientation of the vehicle to be taken. The orientation of the vehicle 5 may be assessed in absolute terms (e.g. on a compass bearing). Alternatively it may be assessed in relative terms (e.g. relative to its starting orientation).

The orientation monitor is adapted to produce a signal which is converted into an "orientation angle" of the vehicle 5 via the processing circuitry, i.e. angle $\beta$ in the figure.

The orientation angle thus produced is then subtracted from the heading angle by the processing circuitry and a "bearing" angle is produced, which bearing angle is independent of the orientation of the tracking vehicle 5 and is a bearing angle relative to the above mentioned predetermined reference direction or frame. In the present embodiment the reference is taken as being the direction of magnetic north since this is easily and readily utilisable, however any other reference as desired or as appropriate may be used.

The bearing angle is then time-averaged by the time-averaging circuitry to eliminate or at least reduce the effects of the multipath interference mentioned hereinbefore.

The receiver 11 and circuitry 12 may operate to calculate the heading on a very short time scale. Thus, a new heading may be calculated say every 100 milliseconds (giving 10 new headings per second) so that in practice there can be no significant change in orientation during the measurement period. The corresponding orientation angle is subtracted from each heading to give a bearing and the resulting bearings, which are unaffected by changes in orientation of the direction finding vehicle are time averaged for as long as is desired to give a resulting bearing which is compensated for multi-path interference.

A long time averaging period is possible, without this causing slowing of the response time, because the information being time-averaged is independent of vehicle orientation. It is not necessary to limit the time averaging period to that necessary to ensure that vehicle orientation has not changed (which period may be quite short when driving within a city where the orientation can change rapidly as the streets twist and turn etc). It is only necessary to limit the period to that necessary to ensure that there has been no significant change in the true direction of the tracked transmitter.

The resulting bearing may be used to produce a static or moving (continuous, or continually updated) display on the display device, such bearing representing the compass bearing of the transmitter. Alternatively the resulting bearing may be converted to a heading, i.e. the direction of the transmitter relative to the vehicle 5, by addition of the current, up to date value of the vehicle orientation $\beta$, and this heading may be displayed.

With the arrangement described it is possible to reduce the effect of multipath interference without unduly limiting response time.

It is of course to be understood that the invention is not intended to be restricted to the details of the above example which are described by way of example only. For example, a separate enhancer unit may be located between the transmitter and receiver.

I claim:

1. A mobile direction finder for tracking a transmitter remote therefrom, said direction finder comprising a receiver for receiving signals from the transmitter, direction-computing means for computing a direction of the transmitter relative to the direction finder from the received signals, time-averaging means for averaging the computed directions over signal-receiving time periods, and a reference device which establishes a datum derived from a predetermined orientation independent of the orientation of the direction finder, wherein said time averaged computed directions are made with reference to said datum.

2. A direction finder according to claim 1, wherein said reference device comprises a magnetic compass.

3. A direction finder according to claim 1, wherein said reference device comprises a gyrocompass.

4. A direction finder according to claim 1 wherein the time-averaged computed directions are made on the bearing obtained by subtracting an angle representative of the orientation of said receiver relative to said datum from an angle representative of the direction of said transmitter relative to said direction finder.

5. A direction finder according to claim 1 wherein said datum comprises magnetic north.

6. A direction finder according to claim 1 including a display device which is arranged to display the time averaged computed direction as a bearing relative to said datum.

7. A direction finder according to claim 1 including a display device which is arranged to display the time averaged computed direction being the direction of the transmitter relative to the direction finder.

8. A mobile direction finder as claimed in claim 1 wherein said receiver changes its orientation with respect to said transmitter while said transmitter is moving relative to said receiver.

9. A method for tracking a transmitter which is remote from a receiver comprising:
 a) receiving signals in a receiver of a mobile direction finder from a remote transmitter while said direction finder and said transmitter are moving relative to each other,
 b) computing a direction of the transmitter relative to the direction of the direction finder from the received signals,
 c) establishing a datum derived from a predetermined orientation independent of the orientation of the direction finder,
 d) averaging the computed directions over signal-receiving time periods with reference to said datum to at least reduce the effects of multipath interference without unduly adversely affecting the time of response to changes in orientation of the direction finder.

10. A method as claimed in claim 9 wherein the time-averaged computed directions are made on the bearing obtained by subtracting an angle representative of the orientation of said receiver relative to said datum from an angle representative of the direction of said transmitter relative to said direction finder.

11. A method as claimed in claim 10 wherein said datum comprises magnetic north and the time-averaged computed direction is displayed on a display device as a bearing relative to said datum.

12. A method as claimed in claim 10 wherein the time averaged computed direction is displayed on a display device.

* * * * *